US011233852B1

(12) United States Patent
Reddy K et al.

(10) Patent No.: US 11,233,852 B1
(45) Date of Patent: Jan. 25, 2022

(54) COMPUTING SYSTEM FOR CO-CONTROLLING PRESENTATION OF CONTENT

(71) Applicant: Microsoft Technology Licensing, LLC, Redmond, WA (US)

(72) Inventors: Pradeep Kumar Reddy K, Hyderabad (IN); Rahul Gupta, Hyderabad (IN); Bhavesh Sharma, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/223,400

(22) Filed: Apr. 6, 2021

(51) Int. Cl.
*H04L 29/08* (2006.01)
*H04L 29/06* (2006.01)
*G06F 40/169* (2020.01)
*G06F 16/176* (2019.01)

(52) U.S. Cl.
CPC ........ *H04L 67/1095* (2013.01); *G06F 16/176* (2019.01); *G06F 40/169* (2020.01); *H04L 63/101* (2013.01); *H04L 67/06* (2013.01); *H04L 67/1097* (2013.01)

(58) Field of Classification Search
CPC . H04L 67/1095; H04L 67/1097; H04L 67/06; H04L 63/101; G06F 40/169; G06F 16/176
See application file for complete search history.

(56) References Cited

U.S. PATENT DOCUMENTS

| 8,799,765 | B1* | 8/2014 | MacInnis | G06F 40/106 |
| | | | | 715/230 |
| 2004/0267871 | A1* | 12/2004 | Pratley | G06Q 10/10 |
| | | | | 709/200 |
| 2011/0252312 | A1* | 10/2011 | Lemonik | G06F 40/186 |
| | | | | 715/255 |
| 2013/0073692 | A1* | 3/2013 | Isaza | H04N 21/632 |
| | | | | 709/219 |
| 2015/0195492 | A1* | 7/2015 | Leerentveld | H04M 3/567 |
| | | | | 348/14.03 |
| 2017/0060829 | A1* | 3/2017 | Bhatt | G06F 40/134 |
| 2018/0203770 | A1* | 7/2018 | Tennoe | G06F 11/1451 |
| 2020/0293493 | A1* | 9/2020 | Janamanchi | G06Q 10/103 |

* cited by examiner

*Primary Examiner* — El Hadji M Sall
(74) *Attorney, Agent, or Firm* — Medley, Behrens & Lewis, LLC

(57) ABSTRACT

A computing system obtains a document that is to be shared between a first user and a second user. A first computing device of the first user displays a first local copy of the document. A second computing device of the second user displays a second local copy of the document. While a first view of the document corresponding to a state of the first local copy is being presented, the computing system receives an indication that the second user is to assume control of presentation of the document from the first user. The computing system receives state data from the second computing device that is indicative of a second view of the document corresponding to the second local copy. Based upon the state data, the computing system causes a state of the first local copy of the content to be updated to present the second view.

20 Claims, 8 Drawing Sheets

COMPUTING SYSTEM FOR CO-CONTROLLING PRESENTATION OF CONTENT

BACKGROUND

Applications that present content (e.g., a document, a slideshow, a spreadsheet, etc.) to users over a network connection play an important role in facilitating collaboration and productivity. Conventionally, content is presented via a screensharing application over a network connection to displays of computing devices operated by the users. In an example where the content is a slideshow, the presenting user causes different slides of the slideshow to be presented via screensharing to the displays of the computing devices. As the content is being presented to the users, the presenting user and the users may communicate with one another via their respective computing devices over the network connection using video-based communication, audio-based communication, text-based communication, or a combination thereof, e.g., through a meeting application that executes on each of their respective computing devices.

Challenges arise with the conventional approaches when more than one user wants to control the presentation of the content. For example, when several users are tasked with presenting different subsets of a slide show. Conventionally, this involves the first user ceasing to screenshare so that the second user can begin to screenshare; or it involves the second user requesting control of the first user's presentation via the screensharing application. As discussed below, each of these conventional solutions disrupts the flow of the meeting, resulting in lower efficiency and productivity and leaving the system vulnerable to network connectivity issues.

SUMMARY

The following is a brief summary of subject matter that is described in greater detail herein. This summary is not intended to be limiting as to the scope of the claims.

Described herein are various technologies that enable input from one computing device to alter how content on another computing device is displayed for presentation to at least two computing devices. For example, a computing system is described herein that includes a content application that is configured to cause a first local copy of content displayed by a first computing device to be updated such that the first local copy of the content mirrors a second local copy of the content displayed by a second computing device, where the first computing device is operated by a first user and the second computing device is operated by a second user. The first local copy and the second local copy may be copies of cloud content retained in a cloud-based storage system. The content application operates independently of a meeting application and enables the first user and the second user to control presentation of the content.

In an example, when the content includes a first portion and a second portion, and the first portion is currently being displayed in the first local copy of the content at the first computing device (while the second portion is not currently displayed), the presented version of the content is the first portion (and not the second portion). When the first computing device receives input with respect to the first local copy of the content that causes the second portion to be displayed in the first local copy of the content (but not the first portion), the presented version of the content is the second portion. When control of the presentation of the content has not yet been assumed by the second user, display of the second local copy of the content does not affect display of the first local copy of the content or the presented version of the content, that is, the second user may navigate/make changes within the second local copy of the content without affecting the display of the first local copy of the content.

When control is granted to the second user (e.g., when the second user assumes control), display of the second local copy of the content affects display of the first local copy of the content, and hence the presented version of the content as well. With more particularity, the computing system receives content state data from the second computing device, where the content state data is indicative of a state of display of the second local copy of the content at the second computing device. Alternatively, the first computing device may receive the content state data directly from the second computing device (e.g., via a peer-to-peer connection). The state of display of the second local copy of the content may differ from a state of display of the first local copy of the content when the content state data is received by the computing system. In a first example, a first portion of the first local copy of the content is displayed in the first local copy of the content and a second portion of the second local copy of the content is displayed in the second local copy of the content. In a second example, the second local copy of the content includes a deletion of an element, an addition of an element, or a modification of an element, where the deletion, the addition, or the modification is not reflected in the first local copy of the content prior to the second user being granted control.

Based upon the content state data received from the second computing device, the first computing device causes display of the first local copy of the content to be updated such that a manner that the first local copy is displayed at the first computing device mirrors how the second local copy of the content is displayed at the second computing device. As the presented version of the content is based upon how the first local copy of the content is displayed at the first computing device, the presented version of the content is also updated based upon how the second local copy of the content is displayed at the second computing device when control is given to the second user. Following the first example given above, the data causes the first local copy of the content to be updated to display the second portion of the content, and hence the presented version of the content may be updated to display the second portion of the content. Following the second example given above, the data causes the first local copy of the content to be updated to include the deletion of the element, the addition of the element, or the modification of the element, and hence the presented version of the content may be updated to display the deletion of the element, the addition of the element, or the modification of the element.

According to some embodiments, the data is the content state data and the computing system transmits the content state data to the first computing device, where the first computing device updates the first local copy of the content based upon the content state data. According to other embodiments, the computing system receives (first) content state data from the first computing device that is indicative of a state of display of the first local copy of the content and (second) content state data from the second computing device that is indicative of a state of display of the second local copy of the content. The computing system determines a difference between the first content state data and the second content state data. The computing system transmits data indicative of the difference to the first computing device, where the first computing device updates the first local copy of the content based upon the data indicative of the difference. Control of the presentation of the content may expire after a predetermined period of time elapses.

The above-described technologies present various advantages over conventional technologies pertaining to altering control of display of presented content. First, unlike approaches that require switching between computing devices from which presented content is broadcast to computing devices used by meeting participants, the above-described technologies do not require extensive server-client communications, nor do the above-described technologies require checking that the same presented version of content is visible to each user. Instead, the presented version of the content is always based upon a manner in which the first local copy of the content is displayed at the first computing device. Second, unlike screen sharing approaches, the above-described technologies do not require screen coordinate translation operations and also avoid associated latency issues. Third, the above-described technologies avoid user frustration and extensive trial-and-error input that is associated with manually instructing the presenting user to adjust display of presented content. Fourth, unlike certain conventional approaches, the above-described technologies are not tied to any particular meeting application. In fact, the above-described technologies may enable users to adjust presented content without utilizing a meeting application.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

Figure 1:
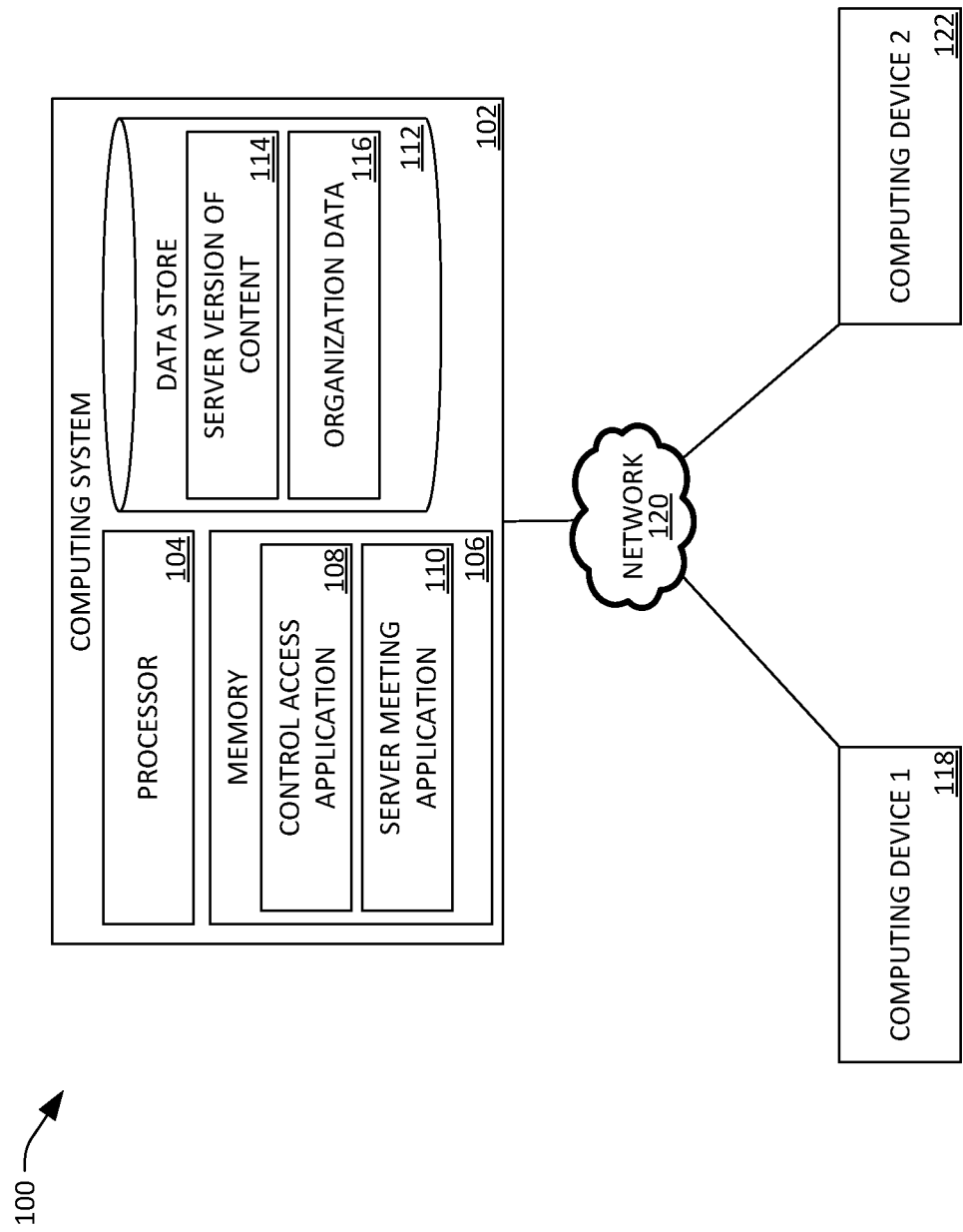
FIG. 1 is a functional block diagram of an example computing environment that facilitates control of presentation of content.

Various technologies pertaining to controlling presentation of content are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

DETAILED DESCRIPTION

Described herein are various technologies that enable input from one computing device to alter how content on another computing device is displayed for presentation to at least two computing devices.

With current systems, when multiple users wish to co-present content (e.g., slides or documents) during a meeting, they must either designate one user as the presenter, or take turns sharing their screen during the meeting. When a first user is designated as the presenter for the meeting, the co-presenters must first ensure that the first user has up-to-date materials from each of them. Moreover, the co-presenters must either rely on the first user to adjust the presentation (e.g., advance the slides) during the co-presenters' portions of the meeting, or request control of the presentation from the first user via the meeting application. Relying on the first user to adjust the presentation often leads to the incorrect portion of the presentation being displayed due to miscommunication between the users. Requesting control of the presentation screen via the meeting application requires the users to understand how both the content application and the meeting application operate and interact, and can also lead to confusion when the control state is not known (e.g., where multiple users may have control at once or where the appropriate person has requested control, but it hasn't yet been granted).

With more particularity, as a computer-executable application presents content to users over a network connection, it may become desirable for the presented content to be adjusted based upon desires of a non-presenting user. In an example where the presented content is a slideshow and a current slide is being presented, a non-presenting user has a question about a previously presented slide in the slideshow and thus it is desirable for the computer-executable application to display the previously presented slide while the non-presenting user poses the question to the presenting user. In another example where the presented content is a document, a non-presenting user notices an error in the document and thus it is desirable for the non-presenting user to correct the error in the document (e.g., by adding an element to the document, deleting an element from the document, and/or modifying an element in the document). There are several conventional approaches for altering which computing device controls content that is simultaneously displayed to several computing devices during a virtual meeting.

In a first conventional approach for altering which computing device controls presentment of content during a virtual meeting, a server meeting application controls presentation of the content by transmitting what is displayed on a first computing device to several other computing devices in network communication with the first computing device. A first user operates the first computing device and a second user operates a second computing device, where the first user is initially a presenting user and the second user is initially a non-presenting user. The first computing device may receive an indication that the second user is to become the presenting user and that the first user is to become the non-presenting user. Alternatively, the second computing device may receive a request from the second user indicating that the second user wishes to become the presenting user, where the request is transmitted to the first computing device, where the first user can either grant the request, thereby causing the indication to be received by the first computing device. In either case, data is transmitted to a server computing device (hosting the server meeting application) that causes control of the presentation to be switched such that the server meeting application transmits what is displayed on the second computing device to the several other computing devices (including the first computing device), and thus the second user becomes the presenting user and the first user becomes the non-presenting user. The second computing device may then receive input from the second user which causes whatever content that is being displayed at the second computing device to be adjusted (e.g., navigating to a different portion of presented content, adding/modifying/deleting an element in the presented content, etc.). The first user is unable to control what is being presented during the virtual meeting until the first user is made the presenting user once again.

In a second conventional approach for altering which computing device controls presentment of content during a virtual meeting, the presenting user may grant control of his/her screen to the non-presenting user. With more specificity, the presenting user operates a first computing device and the non-presenting user operates a second computing device. Upon receiving an indication that control of the first computing device is to be granted to the second computing device, the first computing device transmits data to the second computing device (e.g., via a server computing device), where the data is indicative of a current state of a screen of the first computing device. Based upon the data, the second computing device reproduces the current state of the screen of the first computing device on a display of the second computing device (e.g., within a window shown on a display of the second computing device). The second computing device receives input from the non-presenting user with respect to the (reproduced) screen shown on the display of the second computing device. For instance, the second computing device receives a selection of an element of the content displayed on the (reproduced) screen. The second computing device transmits data indicative of the selection to the first computing device (e.g., via the server computing device), where the first computing device then selects the element of the content based upon the selection. In this manner, the non-presenting user is able to adjust display of the presented content according to his/her desires.

Instead of adjusting which computing device controls presentment of content during a virtual meeting, a non-presenting user may verbally or textually request that the presenting user adjust the presented content. For instance, when the content is a slideshow and the non-presenting user wishes to view a previously presented slide, the non-presenting user asks that the presenting user return the slideshow to the previously presented slide. The computing device operated by the presenting user receives input which causes the slideshow to return to the previously presented slide and the previously presented slide is then displayed to each user to which the content is being presented.

The above-described conventional approaches suffer from various deficiencies and tend not to scale well when content is presented to a relatively large number of users. With respect to the first conventional approach described above, switching between computing devices whose content is presented tends to require numerous client-server communications. Furthermore, each time the presenting computing device is changed, a server computing device checks that the presented content on each computing device of each user matches the presented content on the computing device of the presenting user, which is computationally burdensome. Moreover, while switching presenting computing devices may be adequate in scenarios where multiple presenting users are each to present a relatively large amount of content, switching presenting computing devices is not well-suited for scenarios in which presenting computing devices are often changed. With respect to the second conventional approach described above, screen sharing is a computationally complex process that is burdensome on computing resources (e.g., bandwidth). For instance, coordinates on a screen of a first computing device must be translated to coordinates on a screen of the second computing device and input received on the screen of the second computing device must be translated to coordinates on the screen of the first computing device. Furthermore, screen sharing tends to be sensitive to latency, and can become unresponsive and/or inaccurate in scenarios where there is relatively high amount of latency between the computing devices operated by the presenting user and the non-presenting user. Manually instructing the presenting user to adjust display of the content is time consuming and makes adjustment of the display of the content dependent on the presenting user, which is undesirable. Furthermore, it may be difficult for a non-presenting user to articulate his/her desired adjustment of the display of the content to the presenting user, leading to frustrations on behalf of the presenting user and the non-presenting user. Such scenarios may lead to the presenting user inadvertently navigating to portions of the content that the non-presenting user does not wish to view, which leads to unnecessary input, thus wasting computing resources.

To address these issues and others, technologies are described herein that are configured to cause a first local copy of content displayed by a first computing device to be updated such that the first local copy of the content mirrors a second local copy of the content displayed by a second computing device, where the first computing device is operated by a first user and the second computing device is operated by a second user. A computing system (e.g., a cloud-based computing system) may cause the first local copy of the content to be updated to mirror the second local copy of the content or the second computing device may cause the first local copy of the content to be updated to mirror the second local copy of the content (e.g., via a peer-to-peer connection). The technologies described herein operate independently of a meeting application and enables the first user and the second user to control presentation of the content.

In operation, a computing system obtains an identifier for content, an identifier for a first user, and an identifier for a second user along with an indication that the first user and the second user have control of presentation of the content (e.g., a document, such as a text document, a spreadsheet, a slideshow, etc.). The first user and the second user are to be "co-controllers" of the presentation of the content, that is, either the first user or the second user may control presentation of the content (but not at the same time). For instance, a first computing device operated by the first user (e.g., a primary organizer of a meeting at which the content is to be reviewed) receives an identifier for the second user as input from the first user. The first computing device transmits the identifier for the first user and the identifier for the second user to the computing system. According to some embodiments, the computing system receives the identifier for the first user and the identifier for the second user and determines that the first user and the second user belong to an organization. Upon determining that the first user and the second user belong to the organization, the computing system automatically grants control of the presentation of the content to the second user (as well as the first user) without receiving an explicit indication thereof. According to some embodiments, the computing system receives the identifier for the second user prior to presentation of the content beginning (e.g., prior to a meeting in which the content is presented). According to some embodiments, the computing system receives the identifier for the second user during the presentation of the content such that the second user is made a co-controller during presentation of the content.

Upon obtaining the identifier for the content, the identifier for the first user, and the identifier for the second user, the computing system causes local copies of the content to be generated. With more specificity, a server version of the content may be retained in a data store accessible to the computing system. Upon the first computing device requesting a local copy of the content, the computing system transmits first data to the first computing device operated by the first user, where the first data causes a first local copy of the content to be placed in memory of the first computing device. Similarly, upon the second computing device requesting a local copy of the content, the computing system transmits second data to the second computing device operated by the second user, where the second data causes a second local copy of the content to be placed in memory of the second computing device. The first local copy of the content may be synced with the server version of the content, and the second local copy of the content may be synced with the server version of the content.

The first computing device displays the first local copy of the content on a display of the first computing device. With more specificity, a content application may display the first local copy of the content in a graphical user interface (GUI) provided by the content application, where the content application is configured to create, view, and modify content of a certain type. For instance, when the content is a slideshow, the content application is a slideshow application. The second computing device may display the second local copy of the content on a display of the second computing device, or the second local of the copy of the content may be (initially) minimized in a task bar displayed on the second computing device.

The first computing device and the second computing device may also each display a presented version of the content. Display of the presented version of the content is based upon the first local copy of the content at the first computing device. Initially, the first user controls presentation of the content. With more particularity, the presented version of the content is dependent upon how the first local copy of the content is displayed at the first computing device, and the presented version of the content is simultaneously displayed (e.g., by way of a virtual meeting application) at numerous other computing devices. Participants in a virtual meeting where the presented content is presented, including the first user and the second user, may communicate over a network using audio-based communication, video-based communication, textual-based communication, or a combination thereof.

In an example, when the content includes a first portion and a second portion, and the first portion is currently being displayed in the first local copy of the content at the first computing device (while the second portion is not currently displayed), the presented version of the content is the first portion (and not the second portion). When the first computing device receives input with respect to the first local copy of the content that causes the second portion to be displayed in the first local copy of the content (but not the first portion), the presented version of the content is the second portion. When control of presentation of the content has not yet been assumed by the second user, display of the second local copy of the content does not affect display of the first local copy of the content or the presented version of the content, that is, the second user may navigate/make changes within the second local copy of the content without affecting the display of the first local copy of the content.

The computing system receives an indication that control of the presentation of the content is to be transitioned from the first user to the second user. In an example, the second computing device receives a request for control from the second user. Upon receiving the request, the second computing device transmits the indication to the computing system. The computing system then grants control to the second user. Alternatively, the first computing device may receive the indication from the first computing device directly via a peer-to-peer connection.

When control is granted to the second user (e.g., when the second user assumes control), display of the second local copy of the content affects display of the first local copy of the content, and hence the presented version of the content as well. With more particularity, the computing system receives content state data from the second computing device, where the content state data is indicative of a state of display of the second local copy of the content at the second computing device. Alternatively, the second computing device may transmit the content state data to the first computing device directly via peer-to-peer connection. The state of display of the second local copy of the content may differ from a state of display of the first local copy of the content when the content state data is received by the computing system. In a first example, a first portion of the first local copy of the content is displayed in the first local copy of the content and a second portion of the second local copy of the content is displayed in the second local copy of the content. In a second example, the second local copy of the content includes a deletion of an element, an addition of an element, or a modification of an element, where the deletion, the addition, or the modification is not currently reflected in the first local copy of the content.

Based upon the content state data received from the second computing device, the computing system transmits data to the first computing device which causes display of the first local copy of the content to be updated such that a manner in which the first local copy is displayed at the first computing device mirrors a manner in which the second local copy of the content is displayed at the second computing device. As the presented version of the content is based upon how the first local copy of the content is displayed at the first computing device, the presented version of the content is updated based upon how the second local copy of the content is displayed at the second computing device, due to (when control is given to the second user) the display of the second local copy at the second computing device being mirrored with respect to the first local copy. Following the first example given above, the data causes the first local copy of the content to be updated to display the second portion of the content, and hence the presented version of the content may be updated to display the second portion of the content. Following the second example given above, the data causes the first local copy of the content to be updated to include the deletion of the element, the addition of the element, or the modification of the element, and hence the presented version of the content may be updated to display the deletion of the element, the addition of the element, or the modification of the element.

According to some embodiments, the data is the content state data and the computing system transmits the content state data to the first computing device, where the first computing device updates the first local copy of the content based upon the content state data. According to other embodiments, the computing system receives (first) content state data from the first computing device that is indicative of a state of display of the first local copy of the content and (second) content state data from the second computing device that is indicative of a state of display of the second local copy of the content. The computing system determines a difference between the first content state data and the second content state data. The computing system transmits data indicative of the difference to the first computing device, where the first computing device updates the first local copy of the content based upon the data indicative of the difference. Control of the presentation of the content may expire after a predetermined period of time elapses.

The above-described technologies present various advantages over conventional technologies pertaining to altering control of display of presented content. First, unlike approaches that require switching between computing devices from which presented content is broadcast to computing devices used by meeting participants, the above-described technologies do not require extensive server-client communications, nor do the above-described technologies require checking that the same presented version of content is visible to each user. Instead, the presented version of the content is always based upon a manner in which the first local copy of the content is displayed at the first computing device. Second, unlike screen sharing approaches, the above-described technologies do not require screen coordinate translation operations and also avoid associated latency issues. Third, the above-described technologies avoid user frustration and extensive trial-and-error input that is associated with manually instructing the presenting user to adjust display of presented content. Fourth, unlike certain conventional approaches, the above-described technologies are not tied to any particular meeting application. In fact, the above-described technologies may enable users to adjust presented content without utilizing a meeting application.

With reference to FIG. 1, an example computing environment 100 that facilitates control of presentation of content is illustrated. The computing environment 100 includes a computing system 102. According to some embodiments, the computing system 102 is a server computing device. According to some embodiments, the computing system 102 is a cloud-based computing platform. The computing system 102 includes a processor 104 and memory 106. The memory 106 includes a control access application 108. As will be described in greater detail below, the control access application 108, when executed by the processor 104, is configured to enable control of presentation of content. The computing system 102 may include a server meeting application 110. The server meeting application 110, when executed by the processor 104, is configured to facilitate the transmission of audio data, video data, textual data, or a combination thereof between different computing devices operated by different users, thus enabling the different users to communicate with one another in real time. Although the server meeting application 110 is depicted as being part of the computing system 102, it is to be understood that the server meeting application 110 may execute on a different computing system.

The computing system 102 further includes a data store 112. According to some embodiments, the data store 112 is cloud-based storage. The data store 112 stores a server version of content 112. According to some embodiments, the content may be or include a document, such as a text document, a spreadsheet, or a slideshow. In an example, the text document is a Microsoft® Word document, the spreadsheet is a Microsoft® Excel spreadsheet, and the slideshow is a Microsoft® PowerPoint® slideshow. It is to be understood that the data store 112 may store a plurality of content. According to some embodiments, the data store 112 also stores organization data 116 for users that belong to an organization. The organization data 116 includes identifiers for users that belong to the organization, as well as their respective positions within a hierarchy of the organization.

The computing environment 100 further includes a first computing device 118 operated by a first user (not shown in FIG. 1), where the first computing device 118 is in communication with the computing system 102 by way of a network 120 (e.g., the Internet, intranet, etc.). The computing environment 100 also includes a second computing device 122 operated by a second user (not shown in FIG. 1), where the second computing device 122 is in communication with the computing system 102 by way of the network 120.

Example operation of the computing environment 100 is now set forth. The computing system 102 receives an indication that content is to be presented and that the first user and the second user are to be co-controllers of presentation of content. The computing system 102 causes a first local copy of the content to be placed in memory of the first computing device 118 and a second local copy of the content to be placed in memory of the second computing device 122. The first computing device 118 displays the first local copy of the content. The second computing device displays the second local copy of the content.

The first computing device 118 and the second computing device 122 may display a presented version of the content, where the presented version of the content is dependent upon the first local copy of the content. The first user initially controls presentation of the content. With more particularity, the presented version of the content is dependent upon how the first local copy of the content is displayed at the first computing device 118, and the presented version of the content is simultaneously displayed (e.g., by way of a virtual meeting application) at numerous other computing devices. Participants in a virtual meeting where the presented content is presented, including the first user and the second user, may communicate over a network using audio-based communication, video-based communication, textual-based communication, or a combination thereof.

The computing system 102 receives an indication that control of presentation of the content is to be transitioned from the first user to the second user. The computing system 102 grants control of the presentation of the content to the second user. The computing system 102 receives content state data from the second computing device 122, where the content state data is indicative of a state of display of the second local copy of the content at the second computing device 122. The state of display of the second local copy of the content may differ from a state of display of the first local copy of the content when the content state data is received by the computing system 102. In a first example, a first portion of the first local copy of the content is displayed in the first local copy of the content and a second portion of the second local copy of the content is displayed in the second local copy of the content. In a second example, the second local copy of the content includes a deletion of an element, an addition of an element, or a modification of an element, where the deletion, the addition, or the modification is not currently reflected in the first local copy of the content.

Based upon the content state data received from the second computing device 122, the computing system 102 transmits data to the first computing device 118 which causes display of the first local copy of the content to be updated such that a manner in which the first local copy is displayed at the first computing device 118 mirrors a manner in which the second local copy of the content is displayed at the second computing device 122. As the presented version of the content is based upon how the first local copy of the content is displayed at the first computing device 118, the presented version of the content is updated based upon how the second local copy of the content is displayed at the second computing device 122, due to (when control is given to the second user) the display of the second local copy at the second computing device 122 being mirrored with respect to the first local copy. Following the first example given above, the data causes the first local copy of the content to be updated to display the second portion of the content, and hence the presented version of the content may be updated to display the second portion of the content. Following the second example given above, the data causes the first local copy of the content to be updated to include the deletion of the element, the addition of the element, or the modification of the element, and hence the presented version of the content may be updated to display the deletion of the element, the addition of the element, or the modification of the element.

Figure 2:
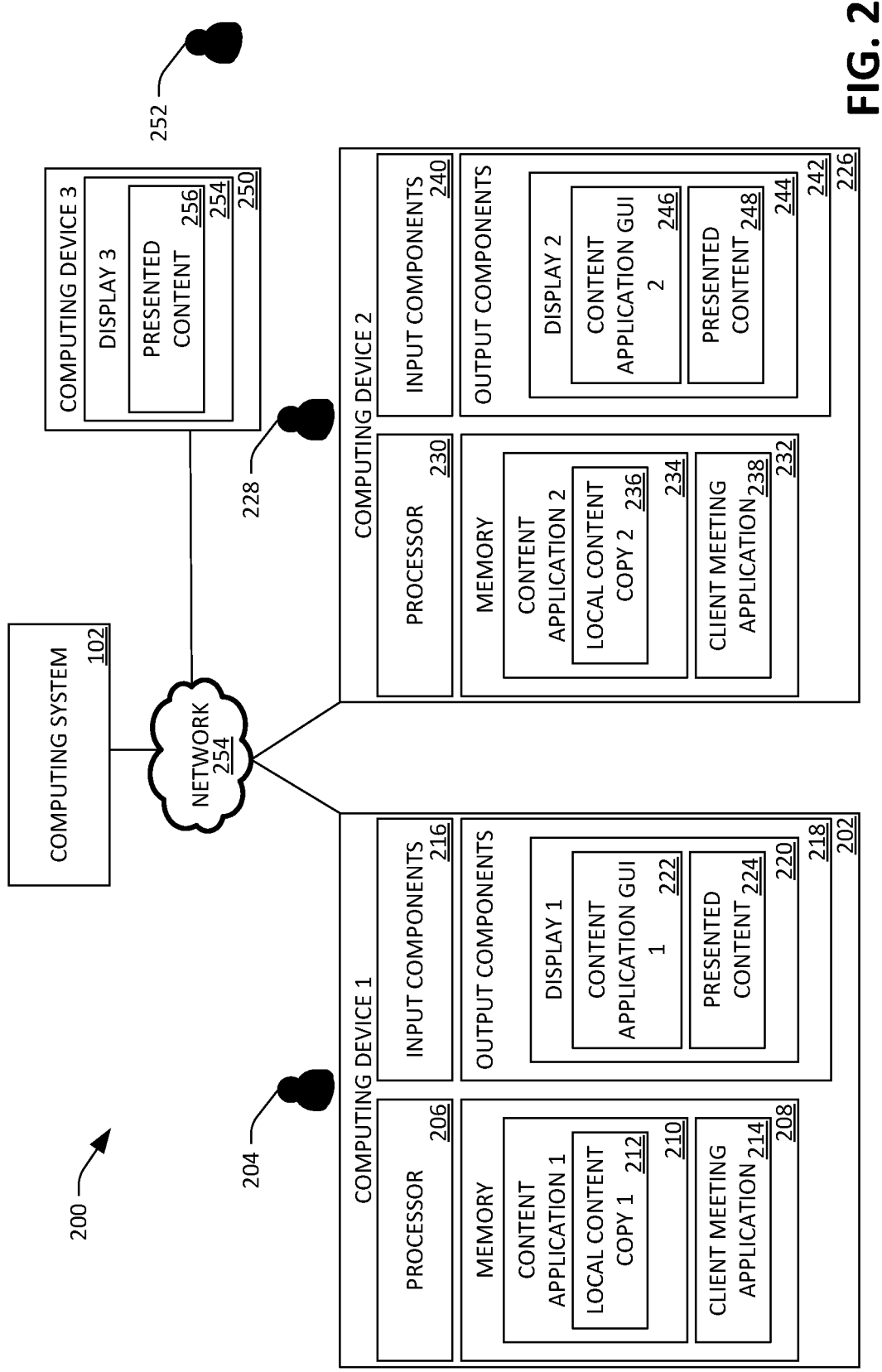
FIG. 2 is a functional black diagram of an example computing environment that facilitates control of presentation of content.

Referring now to FIG. 2, an example computing environment 200 that facilitates control of presentation of content is illustrated. The computing environment 200 includes the computing system 102 described above in the description of FIG. 1 as well as its respective components (e.g., the processor 104, the memory 106, and so forth).

The computing environment 200 includes a first computing device 202 operated by a first user 204. The first computing device 202 may be the first computing device 118 described above in the description of FIG. 1. The first computing device 202 includes a processor 206 and memory 208. The memory 208 includes a first content application 210. The first content application 210 is generally configured to generate, display, and/or modify content. According to some embodiments, the first content application 210 is a word processing application, a spreadsheet application, or a slideshow application. Likewise, according to some embodiments, the content generated, displayed, and/or modified by the first content application 210 is a document, a spreadsheet, or a slideshow. The first content application 210 displays a first local copy of content 212 to the first user 204, where the first local copy of the content 212 may be synced to the server version of the content 114.

According to some embodiments, the memory 208 includes a client meeting application 214. The client meeting application 214 is configured to transmit and receive audio data, video data, textual data, or a combination thereof to/from the server meeting application 110 so as to enable the first user 204 to communicate with different users respectively operating different computing devices.

The first computing device 202 further includes input components 216 that enable the first user 204 to set forth input to the first computing device 202. The input components 216 may include a mouse, a keyboard, microphone, a camera, a video camera, a scroll wheel, a track pad, etc. The first computing device 202 also includes output components 218. The output components 218 include a first display 220. The first display 220 displays a first content application graphical user interface (GUI) 222 for the first content application 210. The first content application GUI 222 displays the first local copy of the content 212. The first display 220 may also display a presented version of the content 224 (which is also stored in the memory 208). According to some embodiments, the first display 220 includes multiple display devices (e.g., a first display device and a second display device), where the first display device displays the first content application GUI 222 and the second display device displays the presented version of the content 224. The presented version of the content 224 may be a read-only version of the first local copy of the content 212. The presented version of the content 224 reflects a state of display of the first local copy of the content 212. According to some embodiments, the presented version of the content 224 is presented by the first content application 210. According to other embodiments, the presented version of the content 224 is presented by the client meeting application 214. The output components 218 may also include a speaker (not depicted in FIG. 1).

The computing environment 200 further includes a second computing device 226 operated by a second user 228. The second computing device 226 may be the second computing device 122 described above in the description of FIG. 1. The second computing device 226 includes components similar or identical to the components of the first computing device 202. For instance, the second computing device 226 includes a processor 230 and memory 232. The memory 232 includes a second content application 234, where the second content application 234 is similar or identical to the first content application 210 (e.g., the second content application 234 generates, displays, and/or modifies content of the same type (document, spreadsheet, slideshow, etc.) as the first content application 210). The second content application 234 displays a second local copy of content 234 to the second user 228, where the second local copy of the content 236 may be synced to the server version of the content 114. Like the first computing device 202, the memory 232 may also include a client meeting application 238. The second computing device 226 includes input components 240 that are similar or identical to the input components 216. The second computing device 226 includes output components 242 that are similar or identical to the output components 218. The output components 242 include a second display 244. The second display 244 displays a second content application GUI 246 for the second content application 234. The second content application GUI 246 displays the second local copy of the content 236. The second display 244 may also display a presented version of the content 248 (which is also stored in the memory 232). According to some embodiments, the second display 244 includes multiple display devices (e.g., a third display device and a fourth display device), where the third display device displays the second content application GUI 246 and the second display device displays the presented version of the content 248.

The computing environment 200 may also include a third computing device 250 operated by a third user 252. The third computing device 250 includes components similar or identical to the first computing device 202 (e.g., a processor, a memory, etc.), all of which are not shown in FIG. 2. The third computing device 250 includes a third display 254 that displays a presented version of content 256. In an example, the first user 204 and the second user 228 belong to an organization, but the third user 226 does not belong to the organization. In another example, the first user 204, the second user 228, and the third user 252 all belong to the organization. In the computing environment 200, the computing system 102 communicates with the first computing device 202, the second computing device 226, and (optionally) the third computing device 250 by way of a network 254 (e.g., the Internet, intranet, etc.).

Operation of the computing environment 200 is now set forth. It is contemplated that the first user 204 wishes to present content to at least one user. The first content application 210 receives, from the first user 204 and via the input components 216, an identifier for the content, an identifier for the second user 228, and an indication that the second user 228 is to have presentation control of the content with the first user 204. The indication may include a first user permission that allows the first user 204 to present the content and a second user permission that allows the second user 228 to present the content. The first content application 210 transmits an identifier for the first user 204 and the identifier for the second user 228 to the control access application 108. The first user 204 and the second user 228 are to be "co-controllers" of presentation of the content, that is, either the first user 204 or the second user 228 may control presentation of the content (but not at the same time). The first content application 210 also transmits, to the control access application 108, the identifier for the content that is to be presented. Optionally, the indication includes a third user permission for the third user 252, where the third user 252 is not to have presentation control of the content, but the third user 252 is able to view a presented version of the content. According to some embodiments, the control access application 108 receives the identifier for the second user 228 prior to presentation of the content beginning (e.g., prior to a meeting in which the content is presented). According to some embodiments, the control access application 108 receives the identifier for the second user 228 during the presentation of the content such that the second user 228 is made a co-controller during presentation of the content.

According to some embodiments, the content that is to be presented is the server version of the content 114 stored in the data store 112. In such embodiments, upon the first content application 210 requesting a local copy of the content, the control access application 108 executes a search over the data store 112 based upon the identifier for the content. The search produces search results that include the server version of the content 114. Based upon the server version of the content 114, the control access application 108 transmits first data to the first content application 210, where the first data causes the first computing device 202 to generate the first local copy of the content 212 in the memory 208. Similarly, upon the second content application 234 requesting a local copy of the content, the control access application 108 executes the previously described search and transmits second data to the second content application 234, where the second data causes the second computing device 226 to generate the second local copy of the content 236 in the memory 232. The first local copy of the content 212 may be synced with the server version of the content 114, and the second local copy of the content 236 may be synced with the server version of the content 114.

According to other embodiments, the content that is to be presented is not yet stored in the data store 112 (e.g., the content is stored on the first computing device 202). In such embodiments, the first content application 210 transmits the content to the control access application 108. The control access application 108 generates the server version of the content 114 (e.g., a copy) based upon the content and stores the server version of the content 114 in the data store 112, where the server version of the content 114 is marked with an attribute that indicates that the server version of the content 114 is temporary and is to be deleted after a duration of time has elapsed. Upon receiving a request from first content application 210, the control access application 108 transmits first data to the first content application 210, where the first data causes the first computing device 202 to generate the first local copy of the content 212 in the memory 208. Similarly, upon receiving a request from the second content application 234, the control access application 108 transmits second data to the second content application 234, where the second data causes the second computing device 226 to generate the second local copy of the content 236 in the memory 232.

According to some embodiments, the control access application 108 automatically determines that the second user 228 is to have presentation control of content (along with the first user 204) without receiving an explicit indication thereof from the first computing device 202. With more specificity, the control access application 108 may receive the identifier for the first user 204 and the identifier for the second user 228 from the first content application 210, without receiving an indication that the second user 228 is to have presentation control of content. The control access application 108 may execute a search over the organization data 116 stored in the data store 112 based upon the identifier for the first user 204 and the identifier for the second user 228 to determine that the first user 204 and the second user 228 belong to the same organization. Upon determining that the second user 228 belongs to the same organization as the first user 204, the control access application 108 grants presentation control to the second user 228 (and the first user 204).

Figure 3A:
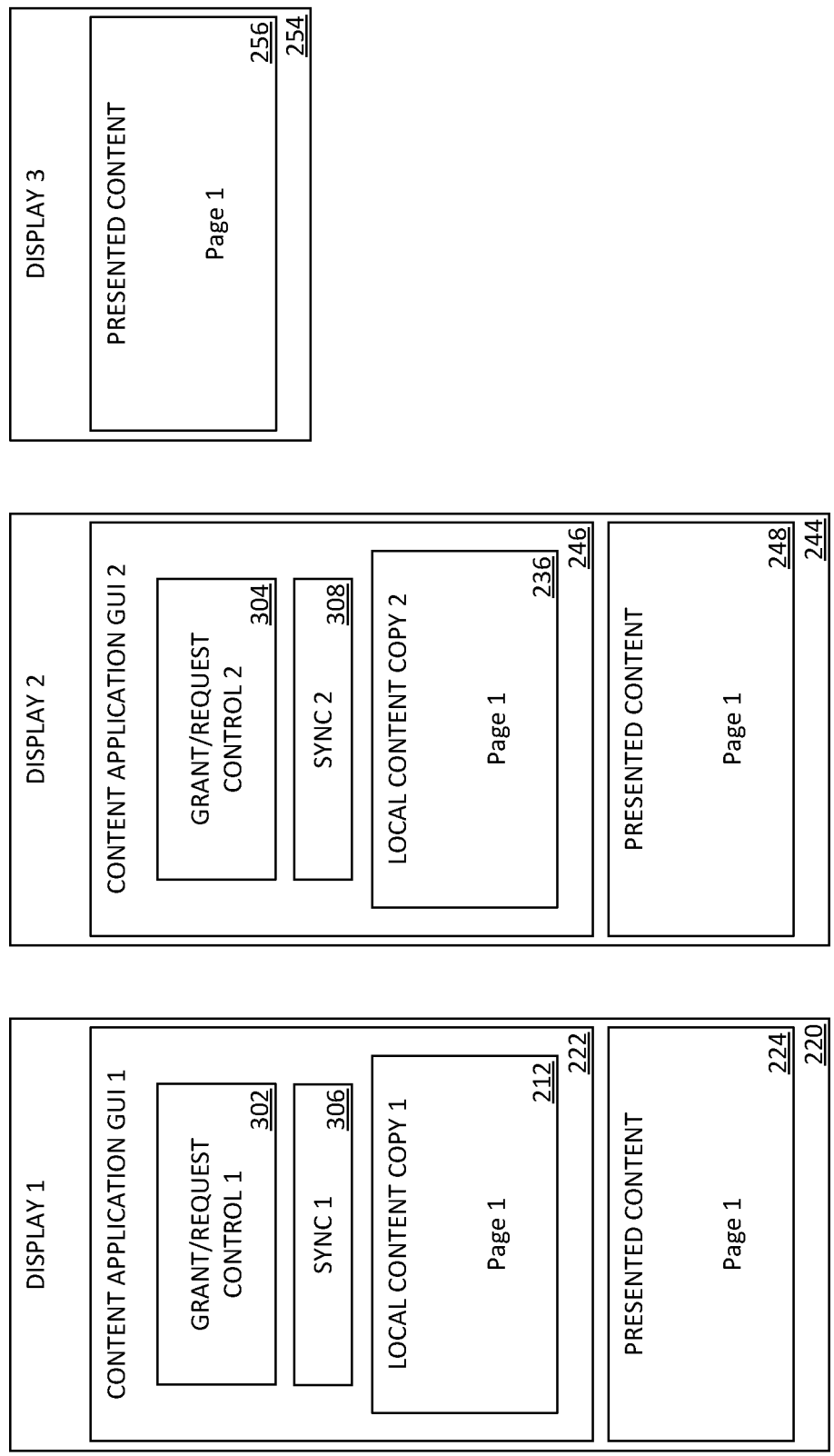
FIG. 3A-C depict sequential example views of content displayed on a first computing device and a second computing device.

Subsequent to generating the first local copy of the content 212, the first computing device 202 displays the first local copy of the content 212 on the first display 220. The second computing device 226 may display the second local copy of the content 236 on the second display 244, or the second local copy of the content 236 may initially be minimized in a task bar displayed on the second computing device 226. Referring to FIG. 3A (in conjunction with FIGS. 1 and 2), an example view of content on the first computing device 202 and the second computing device 226 is illustrated. As depicted in FIG. 3A, the first content application GUI 222 displays the first local copy of the content 212 and the second content application GUI 246 displays the second local copy of the content 236. In the example depicted in FIG. 3A, both the first local copy of the content 212 and the second local copy of the content 236 display the same page (e.g., "Page 1" of the content is displayed in both the first local copy of the content 212 and the second local copy of the content 236).

The first computing device 202 optionally also displays a (first) presented version of the content 224 and the second computing device 226 optionally also displays a (second) presented version of the content 248. The third computing device 250 displays a (third) presented version of the content 256. The (first) presented version of the content 224, the (second) presented version of the content 248, and the (third) presented version of the content 256 are identical (but for their being displayed on the first computing device 202, the second computing device 226, and the third computing device 250, respectively) and as such, the (first) presented version of the content 224, the (second) presented version of the content 248, and the (third) presented version of the content 256 are collectively referred to as "the presented version of the content 224/248/256."

Display of the presented version of the content 224/248/256 is based upon the first local copy of the content 212 at the first computing device 202. Initially, the first user 204 controls presentation of the content. With more particularity, the presented version of the content 224/248/256 matches what is currently being displayed in the first local copy of the content 212. In the example shown in FIG. 3A, the first local copy of the content 212 is displaying "Page 1". As such, the presented version of the content 224/248/256 displays "Page 1."

Figure 3B:
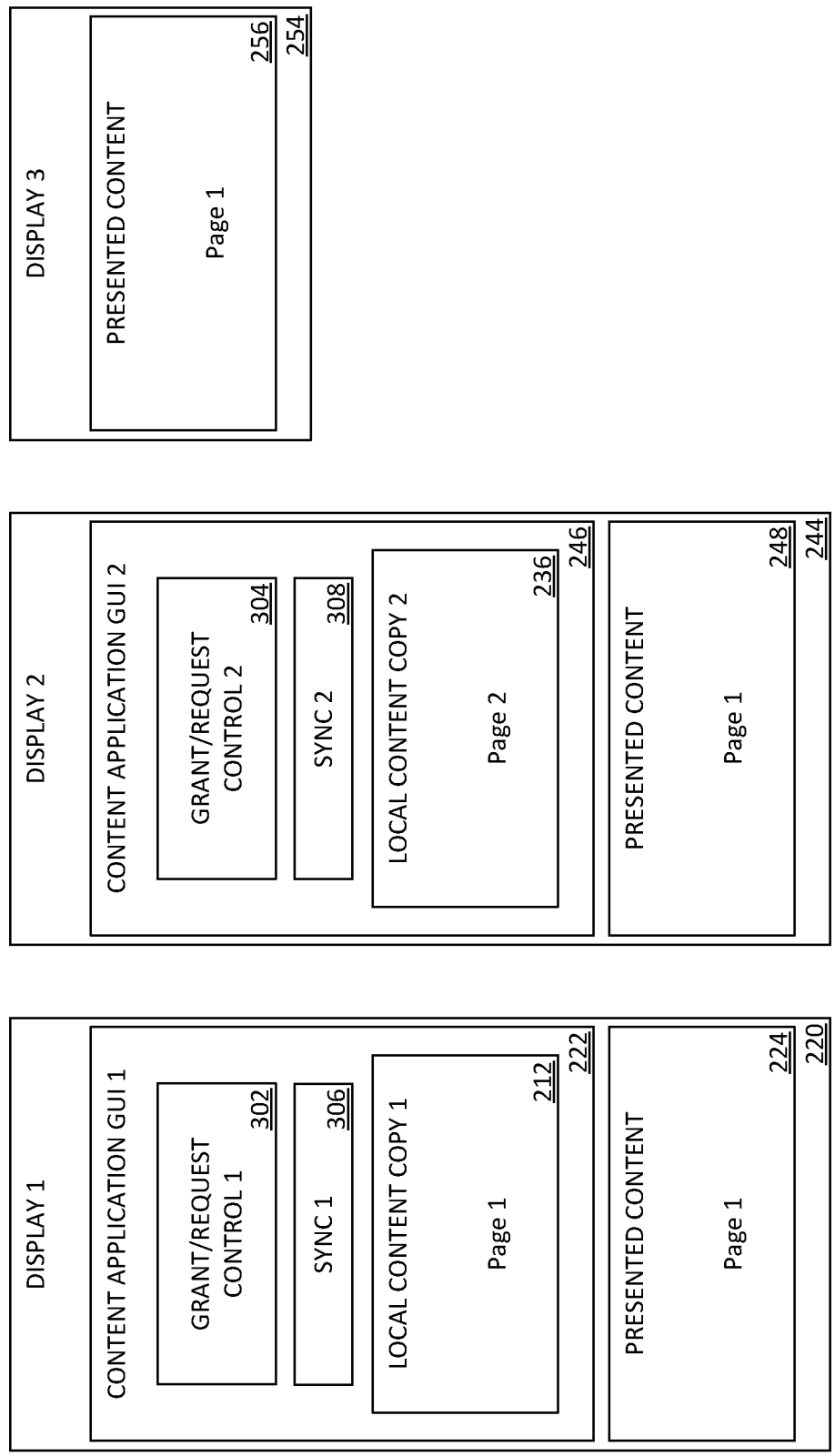

As control has not yet been assumed by the second user 228, display of the second local copy of the content 236 does not affect display of the first local copy of the content 212 or the presented version of the content 224/248/256, that is, the second user 228 may navigate/make changes within the second local copy of the content 236 without affecting the first local copy of the content 212. Likewise, prior to control being assumed by the second user 228, display of the first local copy of the content 212 does not affect display of the second local copy of the content 236. Turning to FIG. 3B (in conjunction with FIGS. 1 and 2), the second computing device 226 has received input from the second user 228 with respect to the second local copy of the content 236 which causes "Page 2" of the second local copy of the content 236 to be displayed on the second display 244. However, as the second user 228 has not yet assumed control, display of the first local copy of the content 212 is not affected, and the first local copy of the content 212 continues to display "Page 1".

It is contemplated that at some point during presentation of the content, it is desirable for the second user 228 to assume control of the presentation of the content from the first user 204. In an example, the first content application GUI 222 displays a first grant/request control button 302. The first grant/request control button 302 is selected by first user 204. The first content application 210 generates an indication that the second user 228 is to assume control of the presentation of the content and transmits the indication to the control access application 108. In another example, the second content application GUI 236 includes a second grant/request control button 304. The second grant/request control button 304 is selected by second user 228. The second content application 234 generates the indication that the second user 228 is to assume control of the presentation of the content and transmits the indication to the control access application 108. According to some embodiments, control of the presentation of the content may expire after a duration of time elapses from when the indication is received by the control access application 108.

According to some embodiments, the second user 228 has not initially been made a co-controller prior to presentation of the content. In such embodiments, the second grant/request control button 304 is selected by second user 228. The second content application 236 generates a request for co-control and transmits the request to the control access application 108. The control access application 108 transmits the request to the first content application 210, which presents the request to the first user 204. The first content application 210 receives input from the first user 210 indicating that the second user 228 is to be made a co-controller and transmits an indication thereof to the control access application 108. The second user 228 may then assume control of the presentation of the content.

The control access application 108 receives the indication that control of the presentation of the content is to be granted to the second user 228. The control access application 108 grants control of the presentation to the second user 228 (e.g., the second user 228 assumes control). With more specificity, upon receiving the indication, the control access application 108 transmits a request for content state data to the second content application 234. Alternatively, the control access application 108 may receive the indication and the content state data concurrently from the second content application 234. The content state data is indicative of a state of display of the second local copy of the content 236 displayed on the second display 244. As previously discussed, prior to control being assumed by the second user 228, display of the first local copy of the content 212 does not affect display of the second local copy of the content 236, and as such, the state of display of the second local copy of the content 236 may differ from a state of display of the first local copy of the content 212. In an example, the state of display of the second local copy of the content 236 differs from the state of display of the first local copy of the content 212 due to the second user 228 navigating to a different portion of the second local copy of the content 236. In another example, the state of display of the second local copy of the content 236 differs from the state of display of the first local copy of the content 212 due to an addition of an element (e.g., a word, a number, a graphic, etc.) to the second local copy of the content 236, a deletion of the element from the second local copy of the content 236, or a modification to the element in the second local copy of the content 236. The second content application 234 transmits the content state data to the control access application 108.

Based upon the content state data received from the second content application 234, the control access application 108 causes display of the first local copy of the content 212 to be updated such that the first local copy of the content 212 displayed by the first computing device 202 mirrors the second local copy of the content 236 displayed by the second computing device 226. As a result, the presented version of the content 224/248/256 is updated based upon the first local copy of the content 212 being updated. With more specificity, the control access application 108 transmits data to the first content application 210 which causes the first content application 210 to update the first local copy of the content 212. According to some embodiments, the data includes the content state data, and as such, the first content application 210 updates the first local copy of the content 212 based upon the content state data. According to other embodiments, the control access application 108 receives (first) content state data from the first content application 210 that is indicative of a state of display of the first local copy of the content 212 and (second) content state data from the second content application 234 that is indicative of a state of display of the second local copy of the content 236. The control access application 108 determines a difference between the first content state data and the second content state data. The control access application 108 transmits data indicative of the difference to the first content application 210, where the first content application 210 updates the first local copy of the content 212 based upon the data indicative of the difference.

Figure 3C:
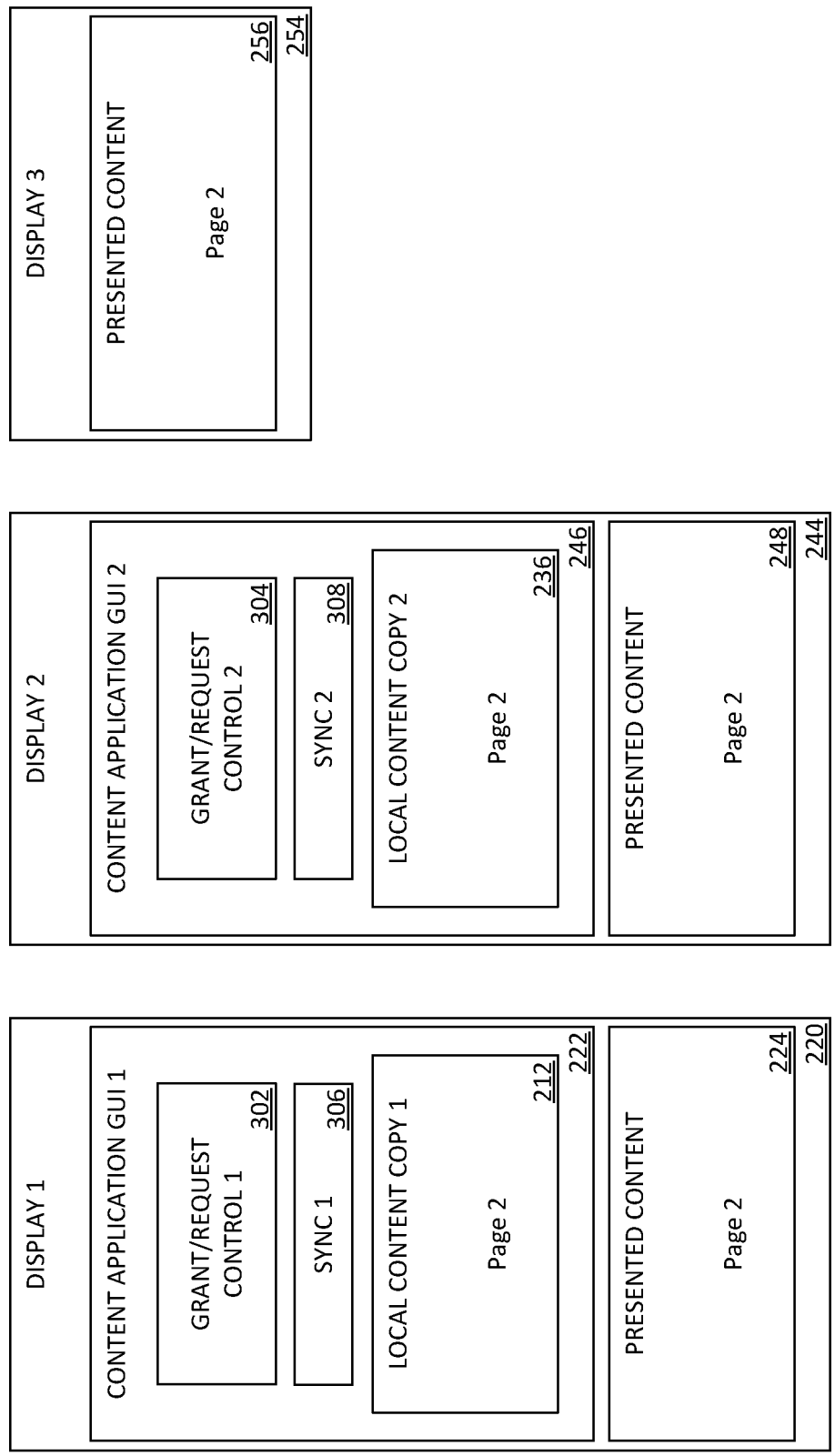

Referring to FIG. 3C (in conjunction with FIGS. 1 and 2), as control of the presentation has been assumed by the second user 228, the server control application 106 has caused the first content application 210 to update the first local copy of the content 212 to mirror the screen state of the second local copy of the content 236 (e.g., the first local copy of the content 212 now displays "Page 2"). As display of the presented version of the content 224/248/256 is based upon the first local copy of the content 212, the presented version of the content 224/248/256 now displays "Page 2" as well. As such, the first computing device 202, the second computing device 226, and (optionally) the third computing device 248 display the same presented version of the content. Control of the presentation of the content by the second user 228 may expire after a predetermined period of time elapses.

According to some embodiments, the first content application GUI 222 displays a first sync button 306 and the second content application GUI 246 displays a second sync button 308. When a sync button is selected by a non-presenting user, a local copy of the content of the non-presenting user is synced to a local copy of the content of a presenting user. Syncing may include adjusting a viewing portion of the local copy of the non-presenting user to match the viewing portion of the local copy of the presenting user. Syncing may also include updating the local copy of the non-presenting user to incorporate additions, modifications, and deletions made to the local copy of the presenting user. In an example and with reference to FIG. 3B, the second sync button 308 is selected by the second user 228 when the first user 204 is controlling presentation of the content. Selection of the second sync button 308 causes the second local copy of the content 236 to be updated such that the second local copy of the content 236 displayed by the second computing device 226 is updated to mirror the screen state of the first local copy of the content 212 displayed by the first computing device 202. Thus, when the second sync button 308 is selected in FIG. 3B, the second local copy of the content 236 is updated to display "Page 1" (e.g., as illustrated in FIG. 3A) due to the first local copy of the content 212 currently being located on "Page 1".

It is to be understood that functionality provided by the grant/request control buttons (e.g., the first grant/request control button 302 and the second grant/request control button 304) and the sync buttons (e.g., the first sync button 306 and the second sync button 308) described above may be incorporated directly into content applications (e.g., the first content application 210 and the second content application 234) or the functionality may be added to the content applications via a plug-in.

Subsequently, the control access application 108 may receive a second indication that the first user 204 is to resume control. In an example, the first grant/request control button 302 is selected by the first user 204. The first content application 210 transmits the second indication to the control access application 108. In another example, the second grant/request control button 304 is selected by the second user 228. The second content application 234 transmits the second indication to the control access application 108. Upon receiving the second indication, the first user 204 resumes control such that display of the second local copy of the content 236 no longer affects display of the first local copy of the content 212.

According to some embodiments, the client meeting application 214, the client meeting application 238, and the server meeting application 110 may exchange audio data, video data, textual data, or a combination thereof over the network 254 during presentation of the content as described above to enable the first user 204 and the second user 228 to communicate during presentation of the content.

Figure 4:
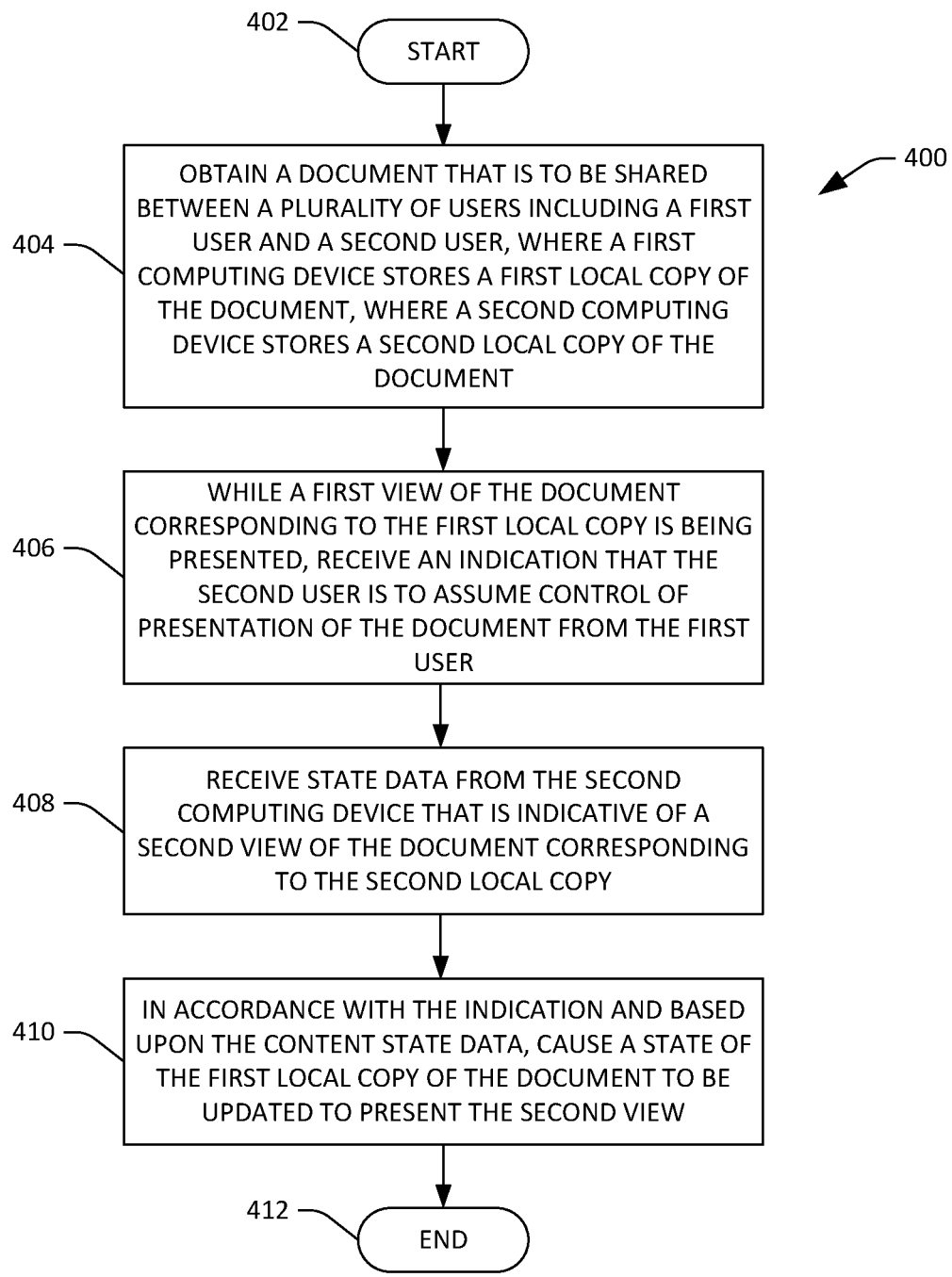
FIG. 4 is a flow diagram that illustrates an example methodology executed by a computing system that facilitates control of presentation of content.
Figure 5:
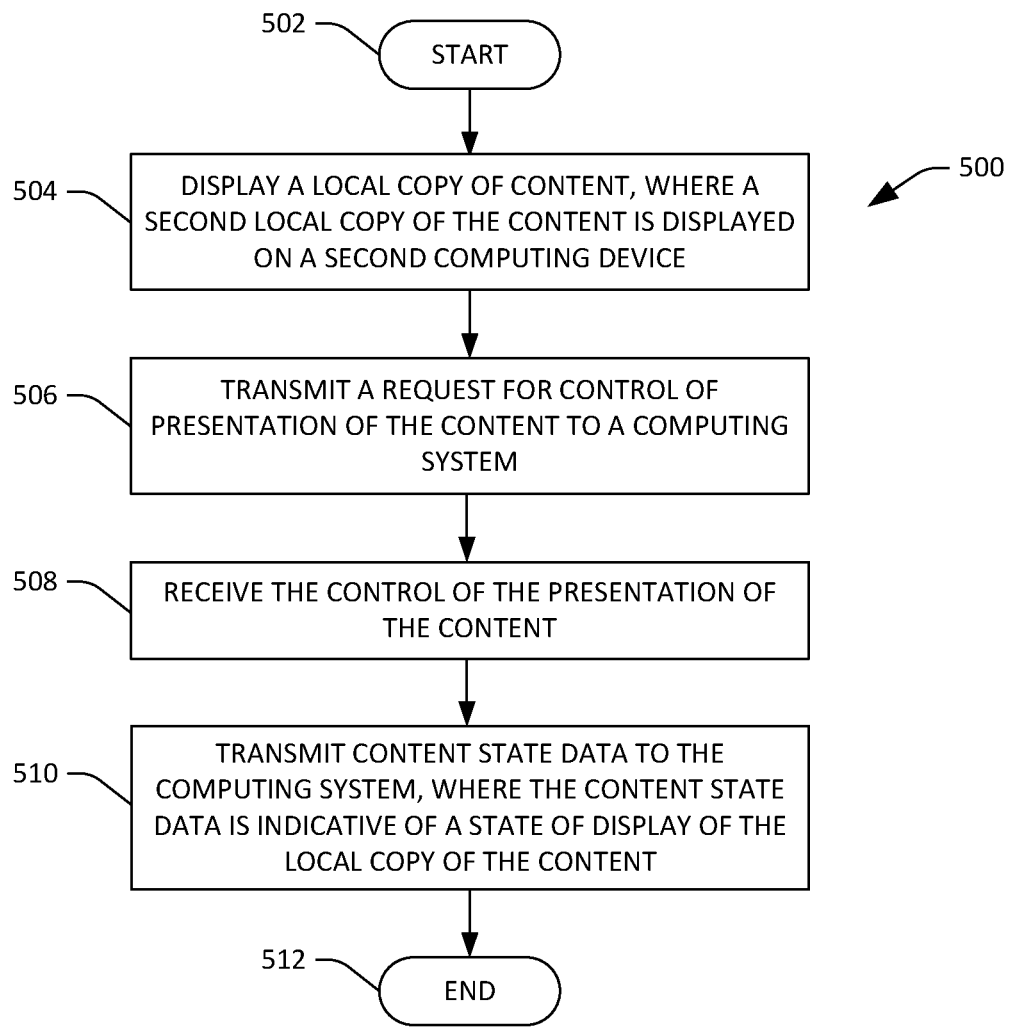
FIG. 5 is a flow diagram that illustrates an example methodology executed by a computing device that facilitates control of presentation of content.

FIGS. 4 and 5 illustrate example methodologies relating to control of presentation of content. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 4, a methodology 400 executed by a computing system that facilitates control of presentation of a document is illustrated. The methodology 400 begins at 402, and at 404, the computing system obtains a document that is to be shared between a plurality of users including a first user and a second user. A first computing device of the first user stores a first local copy of the document and a second computing device of the second user stores a second local copy of the document. At 406, while a first view of the document corresponding to the first local copy is being presented, the computing system receives an indication that the second user is to assume control of presentation of the document from the first user. A second view corresponding to a state of the second local copy does not affect the first view prior to the indication being received. At 408, the computing system receives, from the second computing device, state data that is indicative of the second view of the document corresponding to the state of the second local copy. The second view differs from the first view. At 410, in accordance with the indication and based upon the state data, the computing system causes a state of the first local copy of the document to be updated to present the second view of the document. The methodology 400 concludes at 412.

Turning now to FIG. 5, a methodology 500 executed by a computing device that facilitates control of presentation of content is illustrated. The methodology 500 begins at 502, and at 504, the computing device displays a local copy of content. A second computing device displays a second local copy of the content. A presented version of the content is based upon the second local copy of the content. At 506, the computing device transmits a request to a computing system, where the request indicates that control of the presentation of the content is to be transitioned from the second computing device to the computing device. At 508, the computing device receives control of the presentation of the content from the computing system. At 510, the computing device transmits content state data to the computing system, where the content state data is indicative of a state of display of the local copy of the content. The state of display of the local copy of the content differs from a state of display of the second local copy of the content. Based upon the content state data, the computing system causes the second local copy of the content to be updated to mirror the state of display of the local copy of the content. The presented version of the content is updated based upon the second local copy of the content such that the presented version of the content mirrors the state of display of the local copy of the content. The methodology 500 concludes at 512.

Figure 6:
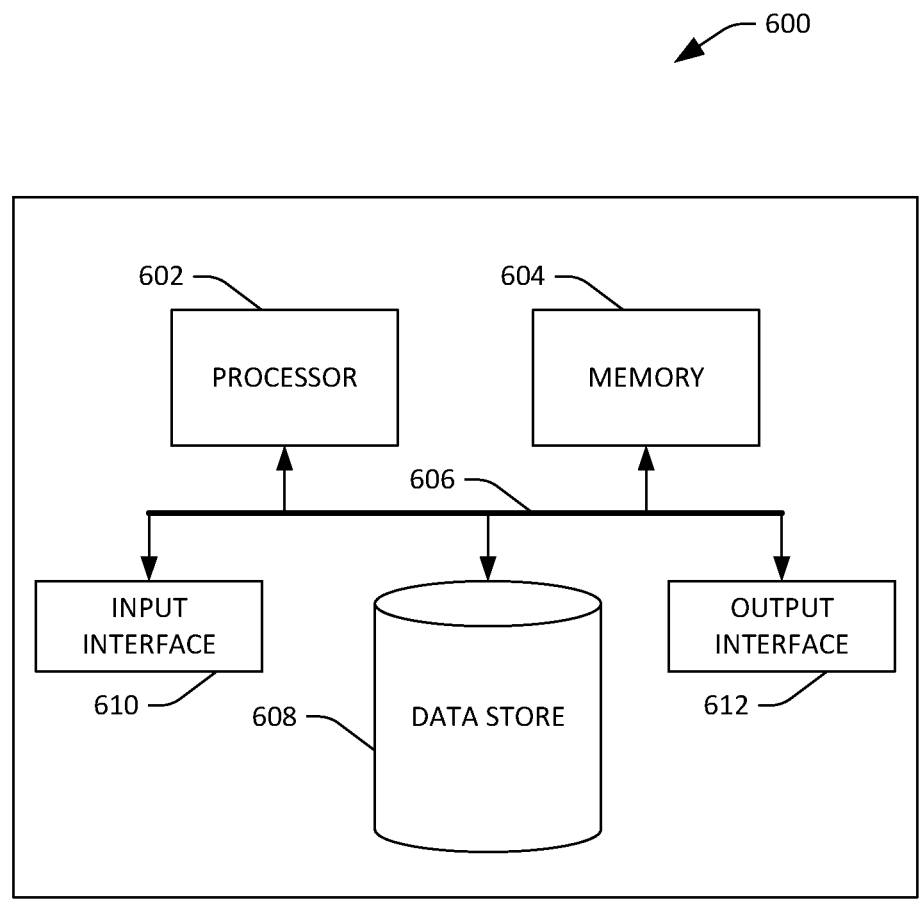
FIG. 6 is an example computing device.

Referring now to FIG. 6, a high-level illustration of an example computing device 600 that can be used in accordance with the systems and methodologies disclosed herein is illustrated. For instance, the computing device 600 may be used in a system that facilitates control of presentation of content. By way of another example, the computing device 600 can be used in a system that executes a content application. The computing device 600 includes at least one processor 602 that executes instructions that are stored in a memory 604. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store server versions of content, local copies of content, organization data, content state data for content, etc.

The computing device 600 additionally includes a data store 608 that is accessible by the processor 602 by way of the system bus 606. The data store 608 may include server versions of content, local copies of content, organization data, content state data for content, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

It is contemplated that the external devices that communicate with the computing device 600 via the input interface 610 and the output interface 612 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 600 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 600 may be a distributed system. Thus, for instance, several devices may be in communication by way of a network connection and may collectively perform tasks described as being performed by the computing device 600.

The present disclosure relates to systems and methods for controlling presentation of content according to at least the examples provided in the sections below:

(A1) In one aspect, some embodiments include a method that facilitates controlling presentation of content. The method is executed by a processor (e.g., 104) of a computing system (e.g., 102). The method includes obtaining (e.g., 404) a document to be shared between a plurality of users. The plurality of users include a first user (e.g., 204) and a second user (e.g., 228). A first local copy of the document (e.g., 212) is stored at a first computing device (e.g., 202) of the first user. A second local copy of the document (e.g., 236) is stored at a second computing device (e.g., 226) of the second user. The method further includes while a first view of the document corresponding to a state of the first local copy of the document is being presented, receiving (e.g., 406) an indication that the second user is to assume control of presentation of the document from the first user. A second view corresponding to a state of the second local copy does not affect the first view prior to the indication being received. The method additionally includes receiving (e.g., 408) state data from the second computing device, the state data indicative of the second view of the document corresponding to the state of the second local copy. The second view differs from the first view. The method also includes in accordance with the indication and based upon the state data, causing (e.g., 410) the state of the first local copy of the document to be updated to present the second view of the document.

(A2) In some of the embodiments of the method of A1, the document is one of a text document, a slideshow, or a spreadsheet.

(A3) In some of the embodiments of any of the methods of A1-A2, the method further includes obtaining a first user permission for the first user, the first user permission allowing the first user to present the document. The method also includes obtaining a second user permission for the second user, the second user permission allowing the second user to present the document.

(A4) In some of the embodiments of any of the methods of A1-A3, the second view differs from the first view due to at least one of an addition of an element to the second local copy of the document, a deletion of the element from the second local copy of the document, or a modification to the element in the second local copy of the document.

(A5) In some of the embodiments of any of the methods of A1-A4, the first local copy of the document is presented within graphical user interface (GUI) (e.g., 222) of a first instance of a content application (e.g., 210) executing on the first computing device. The second local copy of the document is presented within a GUI (e.g., 246) of a second instance of the content application (e.g., 234) executing on the second computing device.

(A6) In some of the embodiments of any of the methods of A1-A5, a first instance of a meeting application (e.g., 214) executes on the first computing device and a second instance of the meeting application (e.g., 238) executes on the second computing device. The first instance of the meeting application and the second instance of the meeting application exchange, over a network (e.g., 254), at least one of audio data, video data, or textual data to enable communication between the first user and the second user.

(A7) In some of the embodiments of any of the methods of A1-A6, the method further comprises determining that the first user and the second user belong to an organization. The method also comprises based upon determining that the first user and the second user belong to the organization, generating a first user permission for the first user and generating a second user permission for the second user. The first user permission allows the first user to present the document and the second user permission allows the second user to present the document.

(A8) In some of the embodiments of any of the methods of A1-A7, causing the state of the first local copy of the document to be updated includes determining a difference between the state of the first local copy and the state of the second local copy. Causing the state of the first local copy of the document to be updated further includes transmitting data indicative of the difference to the first computing device. The first computing device updates the state of the first local copy to present the second view of the document based upon the data indicative of the difference.

(A9) In some of the embodiments of any of the methods of A1-A8, the document is stored in a cloud-based storage system. The first local copy of the document and the second local copy of the document are generated based upon the document stored in the cloud-based storage system.

(A10) In some of the embodiments of any of the methods of A1-A9, the method further includes prior to receiving the indication, obtaining the document. The method additionally includes creating a copy of the document (e.g., 114). The method also includes storing the document in a data store (e.g., 112). The method further includes based upon the copy of the document stored in the data store, transmitting first data and second data to the first computing device and the second computing device, respectively, that causes the first computing device and the second computing device to display the first local copy of the document and the second local copy of the document, respectively.

(A11) In some of the embodiments of any of the methods of A1-A10, a presented version of the document (e.g., 224, 248, 256) is updated based upon the state of the first local copy of the document being updated to present the second view of the document.

(A12) In some of the embodiments of any of the methods of A1-A11, the method further includes obtaining a first user permission for the first user, the first user permission allowing the first user to present the document. The method also includes obtaining a second user permission for the second user, the second user permission allowing the second user to present the document. The method additionally includes obtaining a third user permission for a third user (e.g., 252), the third user permission allowing the third user to view the document, but not present or edit the document.

(A13) In some of the embodiments of any of the methods of A1-A12, the method further includes subsequent to causing the state of the first local copy of the document to be updated, receiving a second indication that the first user is to assume control of the presentation of the document from the second user.

(A14) In some of the embodiments of any of the methods of A1-A13, a presented version of the document (e.g., 224, 248) is displayed by both the first computing device and the second computing device.

(A15) In some of the embodiments of any of the methods of A1-A14, the presented version of the document is additionally displayed by a third computing device (e.g., 250) operated by a third user, where the first user and the second user belong to an organization, and where the third user fails to belong to the organization.

(A16) In some of the embodiments of any of the methods of A1-A15, the indication is received from one of the first computing device or the second computing device.

(A17) In some of the embodiments of any of the methods of A1-A16, a presented version of the document is displayed by each of the first computing device, the second computing device, and a third computing device.

(A18) In some of the embodiments of any of the methods of A1-A17, the indication and the state data are received concurrently.

(B1) In another aspect, some embodiments include a computing system (e.g., 102) that includes a processor (e.g., 104) and memory (e.g., 106). The memory stores instruction that, when executed by the processor, cause the processor to perform any of the methods described herein (e.g., any of A1-A18).

(C1) In another aspect, some embodiments include a non-transitory computer-readable storage medium that includes instructions that, when executed by a processor (e.g. 104) of a computing system (e.g., 102), cause the processor to perform any of the methods described herein (e.g., any of A1-A18).

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. Such computer-readable storage media can comprise random-access memory (RAM), read-only memory (ROM), electrically erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system, comprising:
 a processor; and
 memory storing instructions that, when executed by a processor, cause the processor to perform acts comprising:
  obtaining a document to be shared between a plurality of users, the plurality of users including a first user and a second user, wherein a first local copy of the document is stored at a first computing device of the first user, and wherein a second local copy of the document is stored at a second computing device of the second user;
  while a first view of the document corresponding to a state of the first local copy of the document is being presented, receiving an indication that the second user is to assume control of presentation of the document from the first user, wherein a second view corresponding to a state of the second local copy does not affect the first view prior to the indication being received;
  receiving state data from the second computing device, the state data indicative of the second view of the document corresponding to the state of the second local copy, wherein the second view differs from the first view; and
  in accordance with the indication and based upon the state data, causing the state of the first local copy of the document to be updated to present the second view of the document.

2. The computing system of claim 1, wherein the document is one of:
 a text document;
 a slideshow; or
 a spreadsheet.

3. The computing system of claim 1, the acts further comprising:
 obtaining a first user permission for the first user, the first user permission allowing the first user to present the document; and
 obtaining a second user permission for the second user, the second user permission allowing the second user to present the document.

4. The computing system of claim 1, wherein the second view differs from the first view due to at least one of:
 an addition of an element to the second local copy of the document;
 a deletion of the element from the second local copy of the document; or
 a modification to the element in the second local copy of the document.

5. The computing system of claim 1, wherein the first local copy of the document is presented within graphical user interface (GUI) of a first instance of a content application executing on the first computing device, wherein the second local copy of the document is presented within a GUI of a second instance of the content application executing on the second computing device.

6. The computing system of claim 5, wherein a first instance of a meeting application executes on the first computing device, wherein a second instance of the meeting application executes on the second computing device, wherein the first instance of the meeting application and the second instance of the meeting application exchange, over a network, at least one of audio data, video data, or textual data to enable communication between the first user and the second user.

7. The computing system of claim 1, the acts further comprising:
 determining that the first user and the second user belong to an organization; and
 based upon determining that the first user and the second user belong to the organization:
  generating a first user permission for the first user, the first user permission allowing the first user to present the document; and
  generating a second user permission for the second user, the second user permission allowing the second user to present the document.

8. The computing system of claim 1, wherein causing the state of the first local copy of the document to be updated comprises:
 determining a difference between the state of the first local copy and the state of the second local copy; and
 transmitting data indicative of the difference to the first computing device, wherein the first computing device updates the state of the first local copy to present the second view of the document based upon the data indicative of the difference.

9. The computing system of claim 1, wherein the document is stored in a cloud-based storage system, wherein the first local copy of the document and the second local copy of the document are generated based upon the document stored in the cloud-based storage system.

10. The computing system of claim 1, the acts further comprising:
 prior to receiving the indication, obtaining the document;
 creating a copy of the document;
 storing the copy of the document in a data store; and
 based upon the copy of the document stored in the data store, transmitting first data and second data to the first computing device and the second computing device, respectively, that causes the first computing device and the second computing device to display the first local copy of the document and the second local copy of the document, respectively.

11. The computing system of claim 1, wherein a presented version of the document is updated based upon the state of the first local copy of the document being updated to present the second view of the document.

12. A method executed by a processor of a computing system, the method comprising:
 obtaining a document to be shared between a plurality of users, the plurality of users including a first user and a second user, wherein a first local copy of the document is stored at a first computing device of the first user, and wherein a second local copy of the document is stored at a second computing device of the second user;

while a first view of the document corresponding to a state of the first local copy of the document is being presented, receiving an indication that the second user is to assume control of presentation of the document from the first user, wherein a second view corresponding to a state of the second local copy does not affect the first view prior to the indication being received;

receiving state data from the second computing device, the state data indicative of the second view of the document corresponding to the state of the second local copy, wherein the second view differs from the first view; and in accordance with the indication and based upon the state data, causing the state of the first local copy of the document to be updated to present the second view of the document.

13. The method of claim 12, further comprising
obtaining a first user permission for the first user, the first user permission allowing the first user to present the document;
obtaining a second user permission for the second user, the second user permission allowing the second user to present the document; and
obtaining a third user permission for a third user, the third user permission allowing the third user to view the document, but not present or edit the document.

14. The method of claim 12, further comprising:
subsequent to causing the state of the first local copy of the document to be updated, receiving a second indication that the first user is to assume control of the presentation of the document from the second user.

15. The method of claim 12, wherein a presented version of the document is displayed by both the first computing device and the second computing device.

16. The method of claim 15, wherein the presented version of the document is additionally displayed by a third computing device operated by a third user, wherein the first user and the second user belong to an organization, wherein the third user fails to belong to the organization.

17. A non-transitory computer-readable medium comprising instructions that, when executed by a processor of a computing system, cause the processor to perform acts comprising:
obtaining a document to be shared between a plurality of users, the plurality of users including a first user and a second user, wherein a first local copy of the document is stored at a first computing device of the first user, and wherein a second local copy of the document is stored at a second computing device of the second user;
while a first view of the document corresponding to a state of the first local copy of the document is being presented, receiving an indication that the second user is to assume control of presentation of the document from the first user, wherein a second view corresponding to a state of the second local copy does not affect the first view prior to the indication being received;
receiving state data from the second computing device, the state data indicative of the second view of the document corresponding to the state of the second local copy, wherein the second view differs from the first view; and
in accordance with the indication and based upon the state data, causing the state of the first local copy of the document to be updated to present the second view of the document.

18. The non-transitory computer-readable medium of claim 17, wherein the indication is received from one of the first computing device or the second computing device.

19. The non-transitory computer-readable medium of claim 17, wherein a presented version of the document is displayed by each of the first computing device, the second computing device, and a third computing device.

20. The non-transitory computer-readable medium of claim 17, wherein the indication and the state data are received concurrently.

* * * * *